US012125637B2

(12) United States Patent
Im et al.

(10) Patent No.: US 12,125,637 B2
(45) Date of Patent: Oct. 22, 2024

(54) SHAPE-TRANSFORMABLE SWITCH APPARATUS BASED ON MAGNETORHEOLOGICAL ELASTOMER

(71) Applicants: Kia Corporation, Seoul (KR); Hyundai Motor Company, Seoul (KR); Korea University Of Technology And Education Industry-University Cooperation Foundation, Cheonan-si (KR)

(72) Inventors: Yoon Im, Suwon-si (KR); Yong Won Choi, Seoul (KR); Myung Hoe Kim, Seoul (KR); Joo Hwa Kim, Hwaseong-si (KR); Seok Han Lee, Cheonan-si (KR); Hyun U Ko, Cheonan-si (KR); Sang Youn Kim, Seoul (KR)

(73) Assignees: Hyundai Motor Company, Seoul (KR); Kia Corporation, Seoul (KR); Korea University Of Technology And Education Industry-University Cooperation Foundation, Cheonan-si (KR)

( * ) Notice: Subject to any disclaimer, the term of this patent is extended or adjusted under 35 U.S.C. 154(b) by 192 days.

(21) Appl. No.: 18/061,949

(22) Filed: Dec. 5, 2022

(65) Prior Publication Data

US 2023/0253137 A1 Aug. 10, 2023

(30) Foreign Application Priority Data

Feb. 7, 2022 (KR) ........................ 10-2022-0015656

(51) Int. Cl.
*H01F 7/06* (2006.01)
*H01F 7/08* (2006.01)

(52) U.S. Cl.
CPC ............... *H01F 7/064* (2013.01); *H01F 7/06* (2013.01); *H01F 7/081* (2013.01)

(58) Field of Classification Search
CPC ... H01F 7/06; H01F 7/08; H01F 7/064; H01F 7/081; H01F 1/447; H01F 36/00; H01F 36/0006; H01F 7/16
(Continued)

(56) References Cited

U.S. PATENT DOCUMENTS 10,310,603 B2 6/2019 Vanhelle et al.
11,048,344 B1 6/2021 Drezet et al.
(Continued)

FOREIGN PATENT DOCUMENTS

JP 2019204608 A 11/2019
KR 101016206 B1 2/2011
(Continued)

*Primary Examiner* — Danny Nguyen
(74) *Attorney, Agent, or Firm* — Slater Matsil, LLP

(57) ABSTRACT

In an embodiment a shape-transformable switch apparatus includes an electromagnet arranged inside a housing, wherein the electromagnet has an outer circumferential surface wound with a solenoid coil and is configured to provide a magnetic field when a power is applied to the solenoid coil, a Magnetorheological Elastomer (MRE) disposed on an upper portion of the electromagnet, wherein the MRE is configured to change from an initial soft state to a relatively hard state when the power is applied to the solenoid coil and configured to be pressed and to move upward when the electromagnet moves upward and a switch cover disposed on an upper portion of the housing, the switch cover configured to form a switch shape and to protrude outward when the MRE moves in an upward direction.

17 Claims, 3 Drawing Sheets

(58) Field of Classification Search
USPC .......................................................... 361/160
See application file for complete search history.

(56) References Cited

U.S. PATENT DOCUMENTS

| | | | | | |
|---|---|---|---|---|---|
| 12,003,196 | B2 * | 6/2024 | Kim | ........................ | G06F 3/041 |
| 2023/0074323 | A1 * | 3/2023 | Kim | ....................... | H10N 35/00 |

FOREIGN PATENT DOCUMENTS

| | | | |
|---|---|---|---|
| KR | 101554289 | B1 | 9/2015 |
| KR | 20170046217 | A | 5/2017 |
| KR | 20180134631 | A | 12/2018 |
| KR | 20190054201 | A | 5/2019 |
| KR | 102102961 | B1 | 4/2020 |
| KR | 102129214 | B1 | 7/2020 |
| KR | 102146631 | B1 | 8/2020 |

* cited by examiner

SHAPE-TRANSFORMABLE SWITCH APPARATUS BASED ON MAGNETORHEOLOGICAL ELASTOMER

CROSS-REFERENCE TO RELATED APPLICATIONS

The present application claims priority to Korean Patent Application No. 10-2022-0015656, filed Feb. 7, 2022, the entire contents of which are incorporated herein for all purposes by this reference.

TECHNICAL FIELD

The present invention relates to a shape-transformable switch apparatus based on a Magnetorheological Elastomer (MRE). More particularly, the present invention relates to a shape-transformable switch apparatus based on an MRE, the apparatus using an Electro-permanent Magnet (EPM) that has characteristics in which an N-S polarity is changed by a power applied to a solenoid coil, thereby providing a feeling of using a physical button of a switch by using the MRE that is pushed upward to an outside resulting from the EPM which is moved upward when a magnetic field is formed on the EPM.

BACKGROUND

Generally, as information and communication terminals such as a notebook computer, a smartphone, a tablet PC, and the like, or electronic devices such as a video game console, remote control, and the like have been developed, researches have been recently actively carried out to provide more various user experiences (UX) to the users using these information and communication terminals and electronic devices.

For example, a conventional user terminal shows a two-dimensional plane screen and provides only a simple level of audiovisual feedback for giving sounds in line with content shown on a screen. However, a recent user terminal can provide a screen having a three-dimensional cubic effect and can also provide more complex visual feedback, haptic feedback, and the like that enable the user to feel a force, a sense of movement, a texture, and the like together with a content of the provided screen.

Here, such haptic refers to a tactile sensation that can be perceived by a user when the user touches an object, and includes a tactile feedback perceived by a skin touched on a surface of an object and includes a kinesthetic force feedback perceived when a motion of a joint and a muscle is disturbed.

Recently, as research on an electroactive polymer has been conducted to provide a haptic effect, expectations for the use of the electroactive polymer in various fields such as chemistry, machinery, electricity, medicine, materials, and food are increasing.

For example, the electroactive polymer can be used not only in fields such as a next-generation micro-robot, a micro-aerial vehicle, and so on, but also in industrial fields such as an artificial muscle actuator and so on.

As such, in an actuator using the electroactive polymer, the actuator provides the haptic effect by using a phenomenon in which a polymeric dielectric expands and is compressed when a high voltage is applied to flexible electrodes that are disposed at an upper surface and a lower surface of the polymeric dielectric.

However, in the actuator using the electroactive polymer, since an excessively high voltage is applied to provide a sufficient haptic effect, the actuator has a user safety problem and also has a problem that a physical damage may easily occur.

SUMMARY

Embodiments provide a shape-transformable switch apparatus based on a Magnetorheological Elastomer (MRE), the apparatus using an electromagnet that forms a magnetic field by a power applied to a solenoid coil, and the apparatus using the MRE having characteristics in which the MRE maintains an initial soft state when the magnetic field is not applied but the MRE is changed to a relatively hard state when the magnetic field is applied. By using the electromagnet and the MRE, when the magnetic field is formed, the electromagnet is moved along a movement guide, and the MRE that is changed to the hard state is moved upward, so that a switch having the shape that protrudes is formed. Therefore, the apparatus is capable of providing a kinesthetic sensation of a hard feeling according to an operation of the switch according to whether or not the magnetic field is applied.

Embodiments provide a shape-transformable switch apparatus based on a Magnetorheological Elastomer (MRE), the apparatus including: an electromagnet provided inside a housing, the electromagnet having an outer circumferential surface wound with a solenoid coil, and the electromagnet being configured to form a magnetic field by a power applied to the solenoid coil; the MRE disposed on an upper portion of the electromagnet, the MRE being configured such that the MRE is changed from an initial soft state to a relatively hard state as the power is applied to the solenoid coil, and the MRE being configured to be pressed and moved upward as the electromagnet is moved upward; and a switch cover disposed on an upper portion of the housing, the switch cover being configured to form a switch shape and to protrude outward as the MRE is moved upward.

In addition, the shape-transformable switch apparatus based on the MRE according to an embodiment of the present invention may further include a movement guide connected to the electromagnet from inside the housing, the movement guide being configured to guide a movement path of the electromagnet that is moved upward in a magnetic field direction optionally by the magnetic field.

Here, the movement guide may be provided as a pair of movement guides disposed to be upright from inside the housing, and the pair of movement guides may be respectively coupled to guide members that are respectively provided at opposite end portions of the electromagnet, thereby guiding the movement path of the electromagnet.

In addition, the shape-transformable switch apparatus based on the MRE according to an embodiment of the present invention may further include a power supply portion configured to supply the power for forming the magnetic field to the solenoid coil that is wound on the electromagnet.

In addition, the electromagnet may be formed of an Electro-permanent Magnet (EPM) in which an N-S polarity is changed by the power applied to the solenoid coil.

In addition, the MRE may be inserted into and coupled to a mounting hole that is formed in a center of the upper portion of the housing, and may optionally protrude from the mounting hole as the MRE is pressed by the electromagnet when the MRE is changed to the relatively hard state by the electromagnet.

The switch cover may be formed of a material having elasticity, and may be configured such that a shape of the switch cover is changed as the MRE protrudes outward through the mounting hole.

Meanwhile, the shape-transformable switch apparatus based on the MRE according to an embodiment of the present invention may further include a sensing member disposed inside the switch cover, the sensing member being configured to sense a contact state by using a change in capacitance that is changed according to an approach distance of an object.

Here, the sensing member may be formed of a carbon electrode layer, and may be attached to an inner side of the switch cover.

In addition, the electromagnet may be configured such that the power is applied on the electromagnet optionally by the sensing member as the change in capacitance increases, thereby allowing the MRE to be moved in a magnetic direction.

In addition, the electromagnet may be configured such that the power applied on the electromagnet is turned off as a pressure is applied to the MRE while the switch cover is in a protruding state, thereby allowing the MRE to be moved downward along the movement guide.

Here, the MRE may be changed to an initial state as the power applied on the electromagnet is turned off, thereby allowing the switch shape of the switch cover that protrudes outward to be returned to an initial shape.

Embodiments provide an electromagnet that forms the magnetic field by the power applied to the solenoid coil, and uses the MRE having characteristics in which the MRE maintains the initial soft state when the magnetic field is not applied but the MRE is changed to the relatively hard state when the magnetic field is applied. By using the electromagnet and the MRE, when the magnetic field is formed, the electromagnet is moved along the movement guide, and the MRE that is changed to the hard state is moved upward, so that the switch having the shape that protrudes is formed. Therefore, there is an effect that the kinesthetic sensation of the hard feeling according to the operation of the switch may be provided according to whether or not the magnetic field is applied.

In addition, embodiments provide, when the user's finger approaches or contacts the switch to operate the switch, the switch is changed to the shape that protrudes by sensing whether the user's finger approaches or contacts the switch. Further, by applying a structure in which the carbon electrode layer that is attachable is provided, there is an effect that proximity sensing can be realized through a simple structure.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF ILLUSTRATIVE EMBODIMENTS

Hereinafter, an exemplary embodiment of the present invention will be described in detail with reference to the accompanying drawings.

Advantages and features of the present invention, and methods of achieving the advantages and the features, will be apparent from the accompanying drawings and from embodiments that are described in detail below.

However, the present invention is not limited to the embodiments disclosed below, but may be implemented in various different forms. The present embodiments are intended to complete the invention of the present invention and provided to fully inform the skilled in the art to which the invention pertains of the scope of the present invention. The present invention is defined only by the scope of the claims.

Furthermore, detailed descriptions related to well-known functions or configurations may be omitted in order not to unnecessarily obscure subject matter of the present invention.

Figure 1:
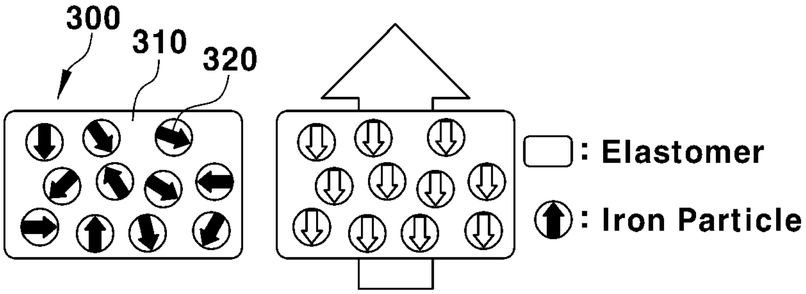
FIG. 1 is a conceptual view illustrating an operation principle of a shape-transformable switch apparatus based on a Magnetorheological Elastomer (MRE) according to an embodiment of the present invention.
Figure 2:
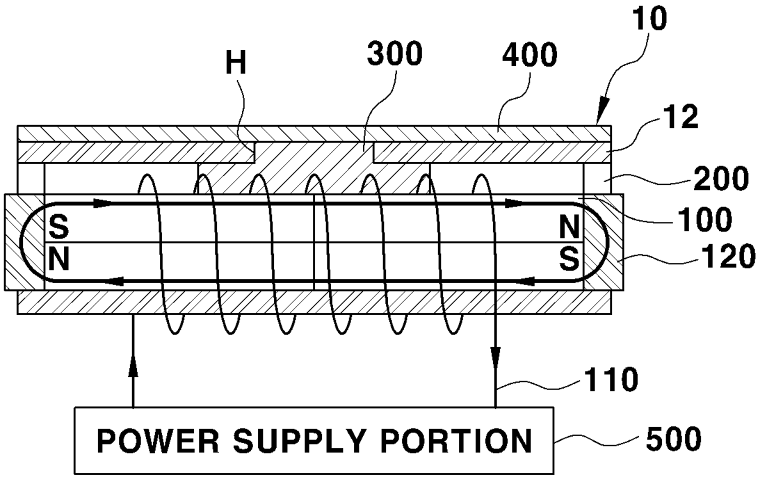
FIG. 2 is a view illustrating a configuration of the shape-transformable switch apparatus based on the MRE according to an embodiment of the present invention.

FIG. 1 is a conceptual view illustrating an operation principle of a shape-transformable switch apparatus based on a Magnetorheological Elastomer (MRE) according to an embodiment of the present invention, and FIG. 2 is a view illustrating a configuration of the shape-transformable switch apparatus based on the MRE according to an embodiment of the present invention.

Figure 3:
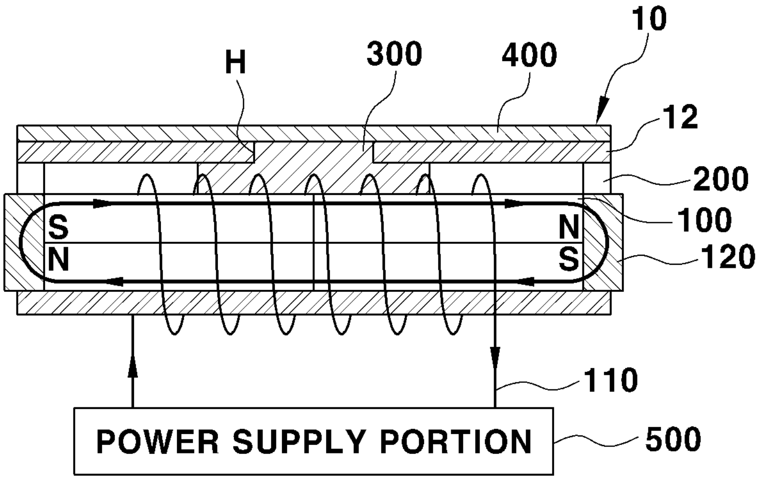
FIG. 3 is a view illustrating a configuration when a magnetic field is not applied to the shape-transformable switch apparatus based on the MRE according to an embodiment of the present invention.
Figure 4:
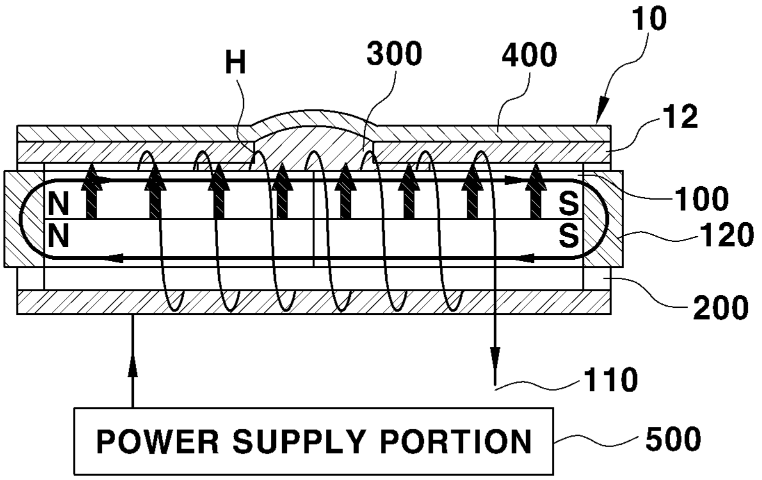
FIG. 4 is a view illustrating a configuration when the magnetic field is applied to the shape-transformable switch apparatus based on the MRE according to an embodiment of the present invention.
Figure 5:
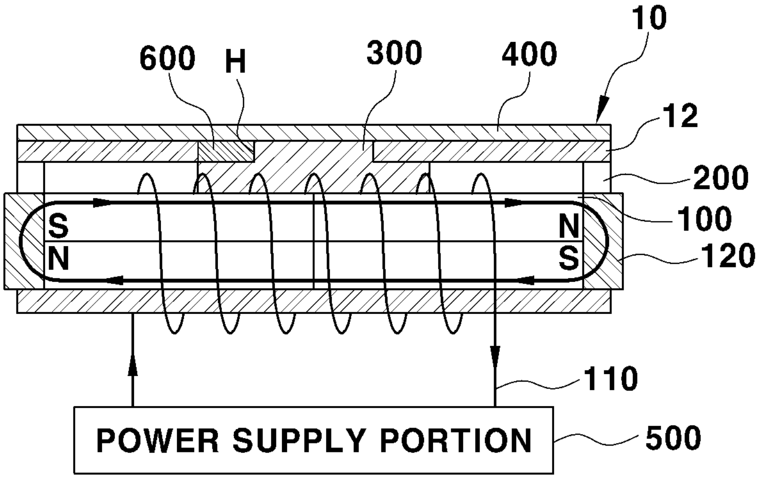
FIG. 5 is a view illustrating a sensing member of the shape-transformable switch apparatus based on the MRE according to an embodiment of the present invention.

In addition, FIG. 3 is a view illustrating a configuration when a magnetic field is not applied to the shape-transformable switch apparatus based on the MRE according to an embodiment of the present invention, FIG. 4 is a view illustrating a configuration when the magnetic field is applied to the shape-transformable switch apparatus based on the MRE according to an embodiment of the present invention, and FIG. 5 is a view illustrating a sensing member of the shape-transformable switch apparatus based on the MRE according to an embodiment of the present invention.

As illustrated in FIG. 2, a shape-transformable switch apparatus based on a Magnetorheological Elastomer (MRE) according to an embodiment of the present invention includes an electromagnet 100, a movement guide 200, a Magnetorheological Elastomer (MRE) 300, and a switch cover 400.

First, the electromagnet 100 is provided inside a housing 10, a solenoid coil 110 is wound on an outer circumferential surface of the electromagnet 100, and a magnetic field is formed by a power applied to the solenoid coil 110.

Preferably, the electromagnet 100 is formed of an Electro-permanent Magnet (EPM) in which an N-S polarity is changed by the power applied to the solenoid coil 110. Here, the electromagnet 100 is a permanent magnet having an N-S polarity, and it can be understood that the electromagnet 100 has characteristics in which the N-S polarity thereof is changed by the applied power.

In addition, the N-S polarity of the electromagnet 100 is changed by the applied power. Further, when the power applied to the solenoid coil 110 is turned off, a magnetic force of the solenoid coil 111 disappears, and a magnetic force of the electromagnet 100 at this time may be maintained for a predetermined period of time.

That is, even if the magnetic force of the solenoid coil 110 disappears since the applied power is turned off, the electromagnet 100 configured of the EPM may be maintained in a previous state for the predetermined period of time, i.e., the magnetic force of the electromagnet 100 may be maintained as before for the predetermined period of time.

The movement guide 200 is connected to the electromagnet 100 from inside the housing 10. As illustrated in FIG. 4, the movement guide 200 is configured to guide the electromagnet 100 to be moved in a movement path of the electromagnet 100, the electromagnet 100 being moved upward along a magnetic direction by the magnetic field generated as the power is applied.

Specifically, the movement guide 200 is a non-magnetic material, and provided as a pair of the movement guides 200 and is disposed upright inside the housing 10. Further, the pair of the movement guides 200 is respectively coupled to guide members 120 that are respectively provided at opposite end portions of the electromagnet 100, i.e., the pair of the movement guides 200 is respectively coupled to bushings as an example, and is configured to guide the movement path of the electromagnet 100 that is optionally moved upward along the magnetic field direction.

The MRE 300 is disposed on an upper portion of the electromagnet 100. Further, the MRE 300 is configured to be changed from an initial soft state to a relatively hard state when the power is applied to the solenoid coil 110 through a power supply portion 500 to generate the magnetic field.

In other words, as illustrated in FIG. 1, when the MRE 300 is in a state in which the magnetic field is not applied, the MRE 300 maintains the initial soft state in which iron particles 320 inside an elastomer 310 are not arranged. Then, when the power is applied to the solenoid coil 110, the iron particles 320 are arranged inside the elastomer 310, and the MRE 300 is changed from the initial soft state to the relatively hard state.

More preferably, the MRE 300 is a MRE having a structure in which a size thereof in the initial soft state becomes small and a state thereof becomes the hard state when the magnetic field is applied. Further, conventionally, the MRE 300 is formed in a flat plate shape.

Therefore, when the MRE 300 becomes the relatively hard state due to the applied magnetic field that is generated on the electromagnet 100, the MRE 300 may provide a kinesthetic sensation to a user who contacts the MRE 300.

A strength in which the MRE 300 is compressed is changed according to an intensity of the applied magnetic field that is formed on the electromagnet 100, so that an intensity of the kinesthetic sensation may be adjusted. Further, the larger the intensity of the applied magnetic field is, the harder state of the MRE 300 may be formed.

The switch cover 400 is disposed on an upper portion of the housing 10, and is provided such that the switch cover 400 forms a switch shape and protrudes outward as the MRE 300 is moved upward.

That is, the switch cover 400 is disposed to be in a flat shape such that the switch cover 400 is in contact with an upper plate 12 which forms the upper portion of the housing 10. Further, the switch cover 400 may be formed of a plastic material having elasticity. More specifically, the switch cover 400 may be formed of thermoplastic polyurethane (TPU).

Accordingly, in a state in which the MRE 300 is inserted into and disposed in a mounting hole H that is provided in a center of the upper plate 12, the state of the MRE 300 becomes the relatively hard state since the magnetic field is formed on the electromagnet 100 by the power applied to the solenoid coil 110. At this time, when the electromagnet 100 is moved upward in the magnetic field direction along the movement guide 200, the MRE 300 is pressed and pushed upward, so that an area of the switch cover 400 facing the mounting hole H protrudes outward.

In this manner, by material characteristics of the switch cover 400, when the center of the switch cover 400 protrudes outward by the MRE 300 that is pushed upward, the user may push the switch cover 400 that protrudes upward while the MRE 300 is in the relatively hard state when the user operates a switch, so that there is an effect that an operation sensation may be provided to the user. Therefore, the kinesthetic sensation of a hard feeling according to the operation of the switch may be provided the user.

Here, when the user presses the center of the switch cover 400 that protrudes, the power applied to the solenoid coil 110 is turned off. Therefore, since the magnetic field is not formed on the electromagnet 100, the MRE 300 becomes the initial state.

More specifically, when the power applied to the solenoid coil 110 by the power supply portion 500 is turned off and then the magnetic field is not formed on the electromagnet 100, the N-S polarity is changed. That is, the polarity of the electromagnet 100 as illustrated in FIG. 4 is changed to the polarity of the electromagnet 100 as illustrated in FIG. 3.

As a result, when the polarity is changed according to the release of the magnetic field, the MRE 300 returns to the initial shape thereof and is moved downward at the same time by gravity and elasticity that the MRE 300 has. Accordingly, the electromagnet 100 is also moved downward along the movement guide 200 and returns to an initial position thereof. Finally, the switch shape, which protrudes on the center of the switch cover 400, becomes an initial shape, i.e., the switch shape becomes the flat shape that is the same as the upper plate 12, so that the switch shape disappears.

Therefore, by using the electromagnet 100 and the MRE 300 optionally, the center of the switch cover 400 protrudes outward when the operation of the user is performed, and the center of the switch cover 400 is released from protruding in other states. Therefore, the kinesthetic sensation of hard feeling may be optionally provided according to the operation of the switch, and also a neat exterior appearance may be formed.

Meanwhile, as illustrated in FIG. 5, the shape-transformable switch apparatus based on the MRE according to an embodiment of the present invention may further include a sensing member 600.

The sensing member 600 is disposed inside the switch cover 400, and is configured to sense a contact state of a user's finger or the like by using a change in a capacitance that is changed according to an approach distance of an object.

Preferably, the sensing member 600 is formed of a carbon electrode layer and is configured to realize a function of a capacitive proximity sensor having a simple structure. Further, the sensing member 600 includes a layer formed of a tape so that the sensing member 600 is attached to and disposed at an inner side of the switch cover 400.

That is, a conventional touch screen panel is an input device which allows a user to operate a display device by touching a display screen button of the display device with the user's finger and which can be easily operated by anyone. Further, as types of the touch screen panel for an example, a resistive type, a capacitive type, an infrared type, an ultrasonic type, and so on are used, and the capacitive type is mainly applied.

Such a capacitive type is a type using a capacitance in a human body, and has a principle in which the capacitance in the human body is used when the user touches the touch screen panel and which detects and calculate a size of an area where the amount of the current is changed and then detects a position. Further, by using this characteristics, the sensing member 600 is configured to sense the contact state of the user's finger or the like through the change in capacitance that is changed according to an approach distance of the user's finger.

As described above, by using the sensing member 600, when the change in capacitance is increased, the power is optionally applied to the electromagnet 100 by an operation control of the power supply portion 500, and the MRE 300 is changed to the relatively hard state by changing the N-S polarity since the magnetic field is formed, so that the shape of the center of the switch cover 400 may be changed to the shape that protrudes (see FIG. 4).

In other words, if the user approaches the switch so as operate the switch, the change in capacitance that is detected according to a current flow change caused by the approach distance between the user's finger and the sensing member 600 is also changed. Therefore, by using this situation, when the change in capacitance is detected by the sensing member 600, the power is applied to the electromagnet 100 through the power supply portion 500, so that the electromagnet 100 is moved upward in the magnetic field direction along the movement guide 200. Finally, the MRE 300 is pushed upward, and the center of the switch cover 400 facing the mounting hole H protrudes outward.

As such, in a state in which the shape of the center of the switch cover 400 protrudes, when it is determined that the user's finger contacts the switch cover 400 and a pressure is applied to the switch cover 400, a voltage applied to the electromagnet 100 is turned off. Therefore, when the pressure by the user is applied to the center of the switch cover 400 that protrudes, the switch cover 400 returns to the flat shape, i.e., the initial shape, so that the user may recognize that the switch is effectively operated.

The present invention uses the electromagnet that forms the magnetic field by the power applied to the solenoid coil, and uses the MRE having characteristics in which the MRE maintains the initial soft state when the magnetic field is not applied but the MRE is changed to the relatively hard state when the magnetic field is applied. By using the electromagnet and the MRE, when the magnetic field is formed, the electromagnet is moved along the movement guide, and the MRE that is changed to the hard state is moved upward, so that the switch having the shape that protrudes is formed. Therefore, there is an effect that the kinesthetic sensation of the hard feeling according to the operation of the switch may be provided according to whether or not the magnetic field is applied.

In addition, in the present invention, when the user's finger approaches or contacts the switch to operate the switch, the switch is changed to the shape that protrudes by sensing whether the user's finger approaches or contacts the switch. Further, by applying a structure in which the carbon electrode layer that is attachable is provided, there is an effect that proximity sensing can be realized through a simple structure.

While the present invention has been and described with reference to embodiment(s) illustrated in the drawings, the embodiment(s) are only illustrative, and it will be understood that various modifications can be made by those skilled in the art, and all or some of the described embodiment(s) may be optionally configured in combination. Accordingly, the true technical scope of the present invention should be defined by the technical spirit of the appended claims.

What is claimed is:

1. A shape-transformable switch apparatus comprising:
an electromagnet arranged inside a housing, wherein the electromagnet has an outer circumferential surface wound with a solenoid coil and is configured to provide a magnetic field when a power is applied to the solenoid coil;
a Magnetorheological Elastomer (MRE) disposed on an upper portion of the electromagnet, wherein the MRE is configured to:
change from an initial soft state to a relatively hard state when the power is applied to the solenoid coil, and
be pressed and move in an upward direction when the electromagnet moves upward; and
a switch cover disposed on an upper portion of the housing, the switch cover configured to form a switch shape thereby protruding outward when the MRE moves in the upward direction.

2. The apparatus of claim 1, further comprising a movement guide connected to the electromagnet inside the housing, wherein the movement guide is configured to provide a movement path for the electromagnet so that the electromagnet is able to move in the upward direction or in a downward direction.

3. The apparatus of claim 2, wherein the movement guide comprises a pair of upright movement guides inside the housing, and wherein the pair of movement guides is coupled to guide members arranged at opposite end portions of the electromagnet respectively.

4. The apparatus of claim 2, further comprising a power supply, wherein the power supply is configured to turn off the power to the solenoid coil when an external pressure is applied to the MRE while the switch cover is in the switch shape thereby allowing the MRE to move in the downward direction along the movement guide.

5. The apparatus of claim 4, wherein the switch cover is configured to change from the switch shape to an initial shape when the MRE is changed to the initial state.

6. The apparatus of claim 1, further comprising a power supply configured to supply the power to the solenoid coil.

7. The apparatus of claim 1, wherein the electromagnet is an electro-permanent magnet (EPM) which is configured to change N-S polarity based on the power applied to the solenoid coil.

8. The apparatus of claim 1, wherein the upper portion of the housing comprises a mounting hole in a center, and wherein the MRE is arranged in and coupled to the mounting hole.

9. The apparatus of claim 8, wherein the MRE is configured to protrude from the mounting hole when the MRE is pressed by the electromagnet and when the MRE changes to the relatively hard state by the electromagnet.

10. The apparatus of claim 9, wherein the switch cover comprises an elastic material, and wherein the switch cover is configured to change its shape from an initial state to a protruding state when the MRE protrudes outward through the mounting hole.

11. The apparatus of claim 1, further comprising a sensor disposed inside the switch cover, the sensor configured to sense a distance of an approaching object.

12. The apparatus of claim 11, wherein the sensor is configured to measure a capacitance based on the distance of the approaching object.

13. The apparatus of claim 12, wherein the sensor comprises a carbon electrode layer attached to an inner side of the switch cover.

14. The apparatus of claim 13, wherein the carbon electrode layer is directly attached to the inner side of the switch cover.

15. The apparatus of claim 14, wherein the switch cover comprises an elastic plastic material.

16. The apparatus of claim 11, further comprising a power supply is configured to provide the power to the electromagnet when the sensor detects the approaching object thereby allowing the MRE to move in the upward direction.

17. The apparatus of claim 16, wherein the sensor is configured to detect the approaching object by a change in capacitance.

* * * * *